(12) United States Patent
Belzowski et al.

(10) Patent No.: US 7,736,681 B2
(45) Date of Patent: Jun. 15, 2010

(54) METHOD FOR APPLYING SOLID EDIBLE PARTICULATES TO AN EDIBLE SUBSTRATE

(75) Inventors: Marla D. Belzowski, Rootstown, OH (US); Richard E. Ludwick, Stow, OH (US)

(73) Assignee: Nestec S.A., Vevey (CH)

( * ) Notice: Subject to any disclaimer, the term of this patent is extended or adjusted under 35 U.S.C. 154(b) by 863 days.

(21) Appl. No.: 11/118,472

(22) Filed: May 2, 2005

(65) Prior Publication Data

US 2006/0246190 A1    Nov. 2, 2006

(51) Int. Cl.
*A23P 1/08* (2006.01)
(52) U.S. Cl. .......................................... 426/289; 118/13
(58) Field of Classification Search ................. 426/289; 118/13
See application file for complete search history.

(56) References Cited

U.S. PATENT DOCUMENTS

| | | | | |
|---|---|---|---|---|
| 3,538,841 A | * | 11/1970 | Vasie | 99/452 |
| 3,693,840 A | | 9/1972 | Starr | 222/193 |
| 3,746,254 A | | 7/1973 | Duncan et al. | 239/15 |
| 4,230,065 A | * | 10/1980 | Carter et al. | 118/17 |
| 4,419,953 A | | 12/1983 | Fowler | 118/16 |
| 4,552,766 A | * | 11/1985 | Ducharme | 426/294 |
| 4,640,219 A | | 2/1987 | Anderson et al. | 118/24 |
| 4,715,275 A | | 12/1987 | Getman | 99/494 |
| 5,109,760 A | * | 5/1992 | Ansari | 99/494 |
| 6,129,037 A | | 10/2000 | Watts et al. | 118/13 |
| 6,558,721 B1 | * | 5/2003 | Parsons et al. | 426/289 |
| 2004/0020375 A1 | * | 2/2004 | Holmes | 99/494 |

FOREIGN PATENT DOCUMENTS

| | | |
|---|---|---|
| DE | 4 414 513 A1 | 11/1994 |
| EP | 0 791 294 B1 | 8/1997 |
| EP | 0 832 695 A2 | 4/1998 |
| GB | 2 124 468 A | 2/1984 |
| GB | 2 177 585 A | 1/1987 |
| GB | 2 277 469 A | 11/1994 |
| JP | 2002-218899 | 8/2002 |
| SU | 1 039 470 | 9/1983 |

* cited by examiner

*Primary Examiner*—Carolyn A Paden
(74) *Attorney, Agent, or Firm*—Winston & Strawn LLP

(57) ABSTRACT

The invention relates to an apparatus and method for applying solid edible particulates to an exposed upper surface of an edible substrate. The apparatus includes a particulate supply, a metered dosing system, a conduit through which the measured particulates are to the edible substrate, an applicator nozzle to direct the measured particulates from the conduit onto the upper surface of the substrate, and a vacuum system that supplies a directed stream of air to accelerate the particulates from the dosing system through the conduit and at least substantially vertically through the nozzle. The particulates are ejected at a velocity sufficient to cut through air currents between the nozzle and substrate, but insufficient to fully penetrate the upper surface of the substrate, to deposit and adhere a substantial amount of the particulates in a desired pattern onto the upper surface of the substrate.

21 Claims, 4 Drawing Sheets

METHOD FOR APPLYING SOLID EDIBLE PARTICULATES TO AN EDIBLE SUBSTRATE

FIELD OF INVENTION

The present invention relates to an apparatus and method for applying solid edible particulates to an edible substrate. The apparatus applies the solid particulates to a food product in a controlled manner through an applicator nozzle. The particulates are ejected so as to cut through air currents between the nozzle and substrate, but not to fully penetrate the surface of the substrate, to deposit and adhere a substantial amount of the particulates in a desired pattern on the substrate.

BACKGROUND OF THE INVENTION

Many methods exist for coating substrates with solid materials. For example, paint sprayers and electrostatic spray guns atomize particles to a very fine mist for application to a desired surface. Application of larger solid particles can be significantly more difficult. The larger particle sizes tend to cause clogging in the machinery.

In the food industry, it is often desirable to apply a solid topping to a base product. Typically, the material is applied by force of gravity. U.S. Pat. No. 4,419,953 discloses an apparatus for applying seasoning to a snack product. The seasoning is simply allowed to fall from an outlet by force of gravity in a continuous stream onto the snack product. Additionally, air currents are provided to force excess seasoning upward to coat the underside of the snack product. Excess seasoning that does not coat the product is collected and recycled through the system. Such a system tends to be extremely messy and inefficient.

U.S. Pat. No. 4,715,275 discloses an apparatus for producing frozen confections including edible particulate material. The particulate material travels from a hopper through conduits and falls onto the confections by force of gravity. Measured quantities of the material are fed through the conduit by timed, intermittent activation of a vibrator that releases the material.

Most commercial food processing systems are continuous systems wherein the food product is conveyed through the system. Such conveyance, particularly at high throughputs, creates air currents that can disrupt the smooth, uniform nature of a material that is falling by force of gravity to be applied to the food product. The material tends to "float" down to the substrate. The air currents caused by conveyance of the food products however, diverts the smaller particles of the material from the substrate. This results in wasted coating material, as much of the particulate material often ends up on the floor or otherwise missing the intended substrate target. This loss in material further necessitates the overfeeding of the material to apply a minimum amount of the material onto the surface of the substrate. This method is not very cost-efficient, particularly because many edible seasoning particulates tend to be relatively expensive compared to the underlying substrate.

Other methods besides the use of gravity have also been used. U.S. Pat. No. 4,640,219 discloses an apparatus for the application of coating material onto the side surfaces of elongated food products. An applicator nozzle and nozzle opening portion of the apparatus correspond to the side surfaces of the elongated food product. The food product to be coated is passed before nozzles discharging horizontally impelled coating material from a coating material supply source that meters desired amounts of coating material to a blower device.

U.S. Pat. No. 6,129,037 discloses a bakery dough flour applicator. A flour supply reservoir or hopper provides a source of flour by means of a transfer assembly to an aeration unit which mixes a predetermined amount of flour with a preset flow of air provided by an auxiliary blower. The airborne flour stream created by the aeration unit is then routed through a distribution network that delivers the stream of airborne flour to an enclosure mounted on the dough processing path. The airborne flour enters the open ended flour applicator enclosure through a series of spray nozzles that direct the flow of airborne flour toward the path of the dough pieces passing along a portion of the processing path, which can take the form of a surface conveyor or a downwardly inclined ramp within the enclosure. The spray nozzles form a cloud or turbulence of airborne flour in the environment of the dough pieces which is confined by the interior surfaces of the flour applicator enclosure and the processing path. The airborne flour forming the turbulence adheres to the sticky exterior surfaces of passing dough pieces and also tends to coat the surfaces of the processing equipment exposed within the enclosure, such as the enclosure interior side walls and the ramp.

As none of the conventional apparatuses accurately and precisely delivers edible particulate toppings in desired patterns to substrates, it is still desired to build an improved apparatus.

SUMMARY OF THE INVENTION

The present invention relates to an apparatus for applying solid edible particulates to an exposed upper surface of an edible substrate. The apparatus includes a particulate supply and a metered dosing system that is adapted and configured to receive a predetermined amount of the particulates from the supply. The apparatus also includes a conduit through which the measured particulates are delivered from the dosing system to the edible substrate, an applicator nozzle associated with the conduit that is adapted and configured to receive and direct the measured particulates from the conduit onto the upper surface of the substrate, and a vacuum system operatively associated with the dosing system and the conduit that supplies a directed stream of air to accelerate the particulates from the dosing system through the conduit and at least substantially vertically through the nozzle. The particulates are applied onto the upper surface of the substrate at a velocity sufficient to eject the particulates from the nozzle so as to cut through air currents between the nozzle and substrate but at a velocity that is insufficient to fully penetrate the upper surface of the substrate, to deposit and adhere a substantial amount of the particulates in a desired pattern onto the upper surface of the substrate.

In one embodiment, the dosing system includes a rotating or reciprocal sliding plate. The plate typically includes at least one aperture for receiving the predetermined amount of particulates from the supply. In an exemplary embodiment, the plate reversibly linearly reciprocates and includes a single aperture.

Generally, the vacuum system includes at least one venturi tube. In some embodiments, the vacuum system is adapted and configured to supply about 1.5 psi to 15 psi air pressure to the particulates, while in another embodiment the air pressure supplied is about 3 psi to 10 psi.

The nozzle is preferably configured to releasably receive and retain a profile that provides a predetermined pattern of particulates onto the substrate. Typically, the nozzle has an outer diameter of about 0.25 inches to 6 inches.

The apparatus of the present invention may be incorporated into a system for continuously applying a plurality of solid particulate doses to a plurality of edible substrates. The system includes the apparatus and a transport means to convey each of the plurality of substrates beneath the nozzle for dosing with the particulates. In a preferred embodiment, the system also includes a return system for collecting excess particulates that are not adhered to the substrate, preferably recycling them for further use in connection with the invention.

The present invention further relates to a method of continuously applying solid edible particulates to an exposed upper surface of a plurality of edible substrates. The method includes providing a directed stream of air to transport a metered amount of solid edible particulates in a path that initially is at least substantially vertically and that terminates in a predetermined pattern onto the upper surface of a plurality of edible substrates and transporting the particulates with a velocity sufficient to cut through air currents that exist in the path of transport adjacent to each substrate, but insufficient to fully penetrate the upper surface of each substrate, so that a substantial amount of the particulates are deposited in the desired pattern on the upper surface of the substrate.

In a preferred embodiment, each substrate is a food product that includes at least one of potatoes, chicken, ice cream, chocolate, bread dough, or cookie dough and the particulates include spices, nuts, sugar, cheese, powders, colorings, chocolate pieces, or mixtures thereof.

In another embodiment, the method also includes providing a source of particulates that are sized and dimensioned to be about 0.01 inches to about 0.25 inches across, and metering a predetermined dose of the particulates from the source to provide the metered amount of particulates.

Generally, each substrate is conveyed in a direction at least substantially transverse to the initial transport path of the particulates and the directed stream of air is provided by a venturi vacuum system. In a preferred embodiment, the particulates are selectively deposited upon each substrate as each substrate passes through the transport path.

The predetermined dose of particulates is typically determined by either a volume or loss-in-weight measurement. In one embodiment, the particulates are directed in a plurality of pulses selectively onto each substrate to minimize or prevent loss of particulates. Each pulse of particulates may be triggered by a sensor that includes a photo eye, an ultrasonic height sensor, or an encoder. In an exemplary embodiment, the particulates are ejected at a rate of about 5 pulses/minute to 30 pulses/minute.

BRIEF DESCRIPTION OF THE DRAWINGS

Further features and advantages of the invention can be ascertained from the detailed description that is provided below in connection with the following drawing(s).

DETAILED DESCRIPTION OF THE PREFERRED EMBODIMENTS

The present invention permits application of solid edible particulates to an edible substrate while minimizing or avoiding one or more of the disadvantages commonly encountered in previous apparatuses or methods. The present invention may be used to apply topping materials or partial coatings onto a variety of edible substrates, such as potatoes, chicken pieces, ice cream bars, chocolate bars, bread or cookie doughs, or any other food item to which it is desired to add solid edible particulates. The present invention may be used, for example, to apply a "puff" of material to the top of potatoes to make it look like someone sprinkled the potato randomly with a salt shaker or to apply sprinkles in a pre-determined pattern, preferably ordered, to wet-coated ice cream bars.

The present invention uses directed air to help particulates overcome air currents, thus permitting the material to be placed more directly where it is desired, instead of allowing gravity and lateral air currents to divert it away from the substrate. The present invention thus differs from existing apparatuses and methods that rely on gravity to deliver decorative or functional particulates onto the upper or outside surfaces of edible products. By using a slightly positive air stream to direct and distribute the particulates uniformly, e.g., in a geometric pattern or shape, letters, or words, or randomly onto the substrate, a design or repeatable pattern can be achieved without the substantial loss of materials usually incurred in conventional topping applicator systems.

The present invention includes a particulate supply, a metered dosing system, a vacuum system, a conduit, and an applicator nozzle. The vacuum system provides a directed stream of air for accelerating the particulates from the conduit to the nozzle and initially substantially vertically through an opening in the nozzle onto the substrate, preferably directly onto the substrate. The particulates are ejected from the nozzle with a velocity sufficient to move through air currents that exist between the nozzle and substrate, but not to fully penetrate the surface of the substrate, so that a substantial amount of the particulates are deposited in a desired pattern or arrangement on the exposed surface of the substrate. It should be understood that the desired pattern may either be ordered or random, depending on the effect desired according to the invention. By "substantial amount" of particulates is meant at least about 90%, preferably at least about 95%, and more preferably at least about 97%, of the amount of particulates.

Figure 1:
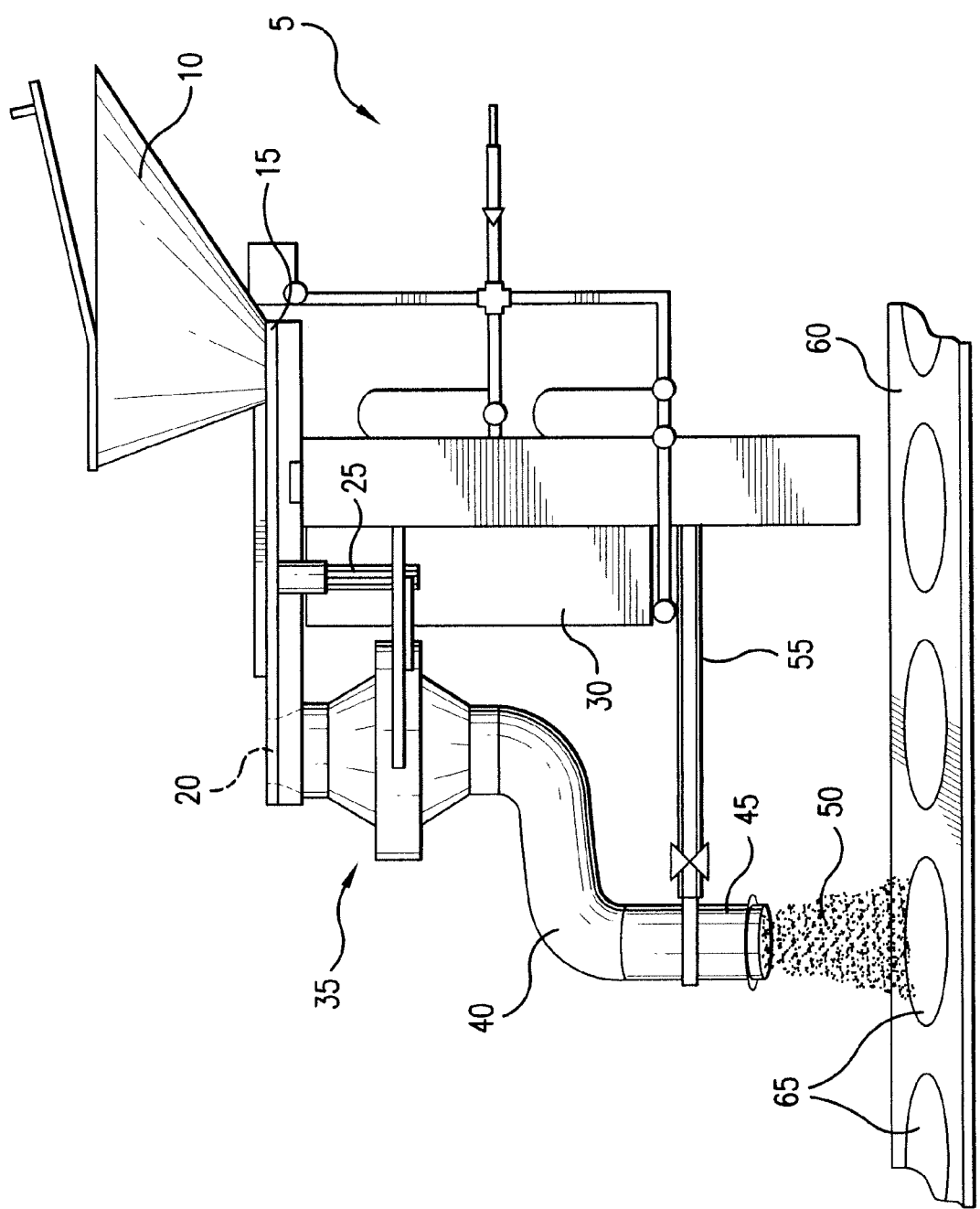
FIG. 1 illustrates a side view of an apparatus and system according to the present invention.

Referring to FIG. 1, the particulate supply in a preferred embodiment includes hopper 10. Hopper 10 provides a plurality of solid edible particulates in the apparatus 5. Hopper 10 includes an opening 12 (not shown) through which particulates are transferred from hopper 10 to the dosing system.

The supply preferably has a volume sufficient to supply edible particulate matter contained therein to the dosing system for an extended period of time. Preferably, the supply is continuously or periodically filled so as to always contain a supply of additional edible particulates. Alternatively, when the supply is empty or substantially so, the supply may be filled manually from bulk supplies of the particulate matter. In either situation, supply can also be replenished in part from an integrated recycling system.

The solid particulates can be any one or more food products or additives, such as regular or dried spices, nuts, colored sugar particulates, grated or shredded cheese, chives, bread crumbs, colorings, chocolate pieces or chunks, rice, pasta, vegetables, sweet toppings, e.g., fruits or sweeteners, nuts including peanuts, pine nuts, cashews, or decorator, nonpareils, buttons, SMARTIES®, or other powders, or any other particulate to be applied to the upper surface or outside of a substrate. Spices include paprika, parsley, oregano, black pepper, red pepper, salt, sugar, sesame seeds, and the like. The particulates may be any size that allows them to be ejected through the opening of the nozzle. The particulates are, however, generally sized and dimensioned to be about 0.01 inches to 0.25 inches across, and preferably about 0.05 to 0.2 inches across, and in certain embodiments they are more preferably about 0.8 to 0.15 inches across. The size of the particulates is only limited by the size of the nozzle and the size of the substrate to which they are to be applied. Larger nozzles are generally necessary for larger particulates. Increased vacuum pressure is also preferred for larger sized particulates to facilitate ejection thereof from the nozzle.

The metered dosing system is adapted and configured to receive a predetermined amount or dosage weight of the particulates from the supply. Any suitable dosing system that is available for measuring dry particulates can be used. The dosing system preferably includes a structure or zone with a pre-defined volume to meter repeated amounts of substantially the same amount of particulates. Preferably, the dosing system includes a rotating 15 or reciprocal sliding plate with at least one aperture 20. When the plate is a rotating plate, plate 15 is preferably operatively associated with a spindle 25 attached to a motor 30, e.g., an air motor, to spin the plate. The plate is typically sandwiched between two layers of a polyolefin component, e.g., an ultra high molecular weight alpha-olefin polymer. The plate and polyolefin layers may be made of any U.S.D.A.-approved food grade material(s). Preferred plate materials include any plastic or metal. Preferably, the plate and layers are made from one or more polyether-polyamide (e.g., a nylon), a vinyl-containing polymer, or alpha-olefin polymer(s). Preferred alpha-olefin polymer(s) include one or more polypropylene or polyethylene components as a predominant portion of the plate, particularly propylene, ethylene, and blends and mixtures thereof. In the case of an air motor, small air lines in the back of apparatus 5 (not shown) supply air to air motor 30, which is behind vacuum system 35. This turns plate 15 in a pulsing fashion so as to meter out the amount of particulates needed for each dose.

Figure 2:
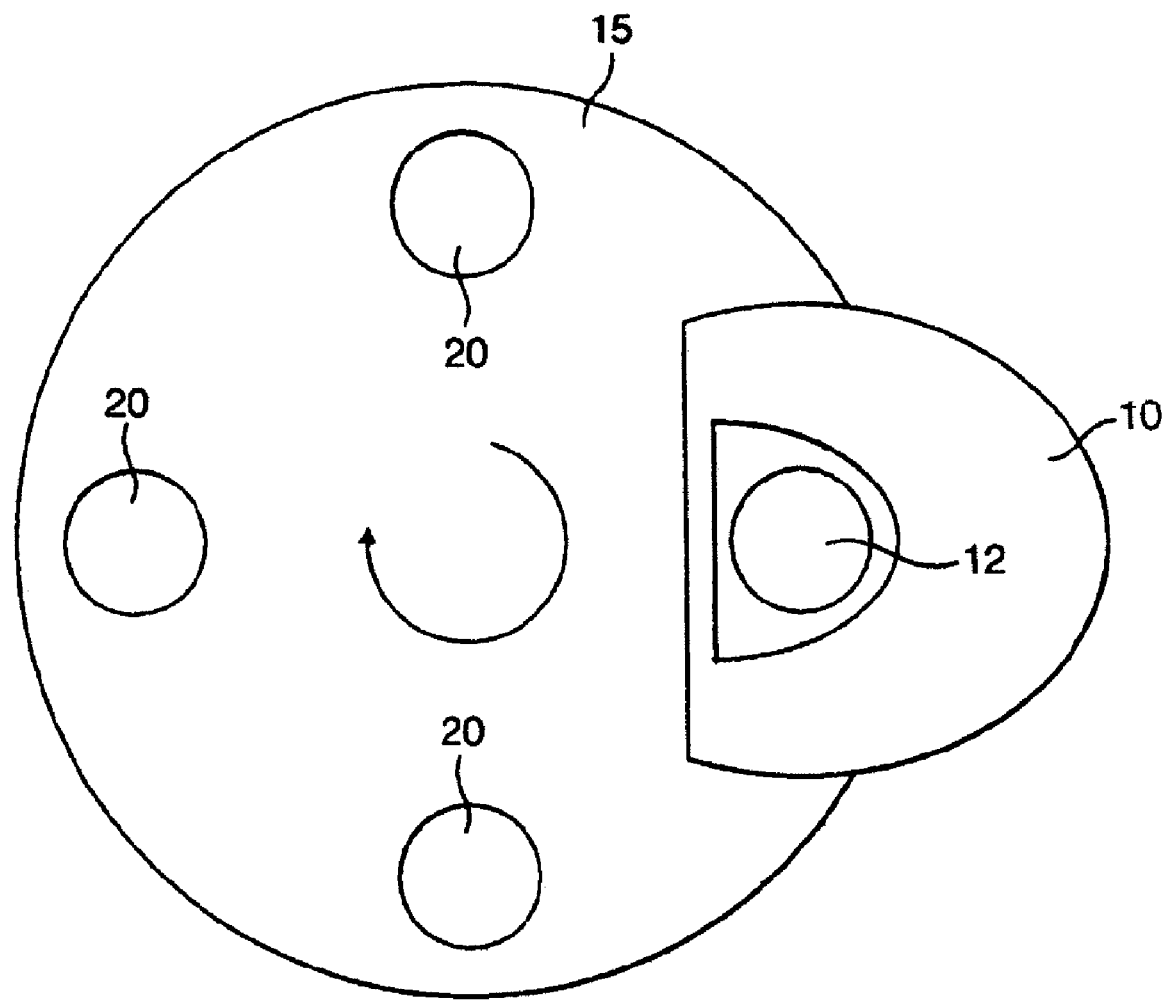
FIG. 2 is a top view of a rotating plate dosing apparatus according to the present invention.

The operation of plate 15 is shown in more detail in FIG. 2. Hopper 10 contains an opening 12 through which the solid particulates move into proximity with plate 15. Plate 15 preferably contains multiple apertures 20 and is capable of rotating, such as in the direction shown by the arrow in FIG. 2. When an aperture 20 in plate 15 lines up with opening 12 in hopper 10, the solid particulates are released to plate 15. When aperture 20 passes away from opening 12, the particulates are no longer capable of moving downward from the hopper 10. In this way, the dosage weights of solid particulates can be precisely metered. This control can be enhanced by using a computer or other control system to operate the rotation of plate 15, which in particular helps with releasing pre-measured doses at the appropriate time into the air stream for direction onto a substrate. Other devices to measure the amount of solid particulates for each dosage weight are also within the scope of the invention, such as a flat block with changeable spacers, a pneumatic arm to actuate the plate back and forth, or any other suitable device known to those of ordinary skill in the art.

Figure 3:
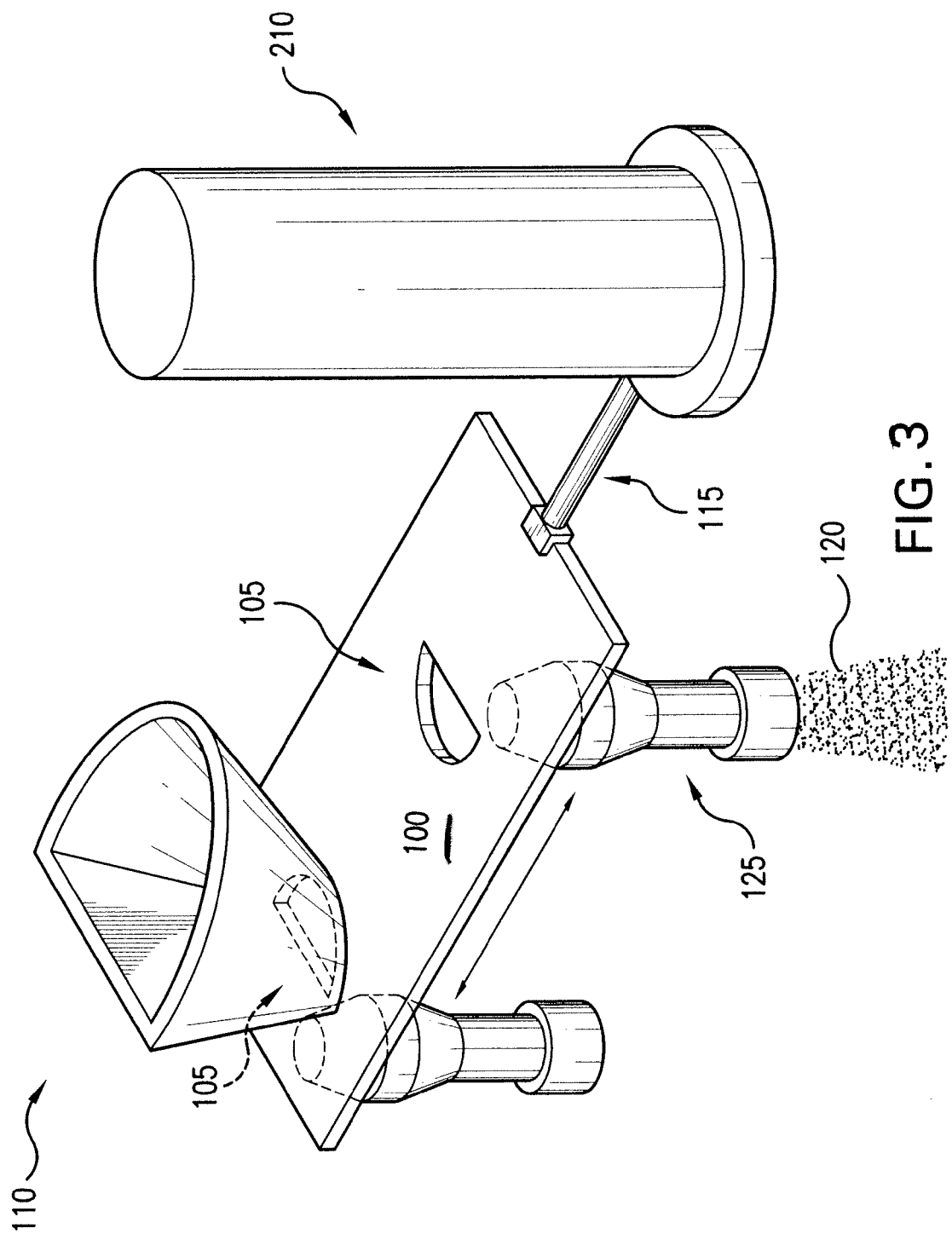
FIG. 3 illustrates a perspective view of a reciprocating plate dosing system according to the present invention.

As shown in FIG. 3, when the plate is a reciprocal sliding plate 100, it can operate similarly to the rotating plate described above. Hopper or supply source 110 is configured and adapted to deposit particulates in each aperture 105. In one preferred embodiment, the sliding plate 100 is preferably operably associated with a fly wheel having a servo motor or a mechanical cam (not shown) to deposit the dosage weight of particulates 120 into the air stream 125 provided by the vacuum system, in time with the passing substrate beneath the nozzle. Preferably, the plate reversibly linearly reciprocates. The plate can have any number of apertures or wells, but preferably it includes one or two apertures. The embodiment shown depicts a single half-moon aperture 105. With two apertures, one can be filled with particulates while the other is releasing particulates into the air stream, and then the plate is slid to release the particulates from the first aperture and provide them into the second, and so on. More preferably, the sliding plate 100 includes a single aperture 105 that receives and then releases each dose in precise timed fashion. A small pneumatic arm 115 operated by pneumatic cylinder 210 may optionally, e.g., be used to actuate the plate back and forth to deliver the dosage weight to the air stream associated with the vacuum system. This can be operatively associated with a substrate transport mechanism, such as a conveyor line, so that the dosing system releases doses in pulses that coincide with a substrate that will be in the transport path of the particulates at a time when the particulates arrive at an upper surface of the substrate. Preferably, the timing of substrate motion via the transport mechanism can be achieved with a photoelectronic eye, or the motion can simply be timed to the exact ejection of the particulates with an encoder run off the servo control. There are many other available ways to coordinate the dosage release to the substrate motion so that the dosing system will fire the dosage weight at the correct time to achieve suitable accuracy when ejecting the particulates onto an upper surface of each substrate.

Figure 4:
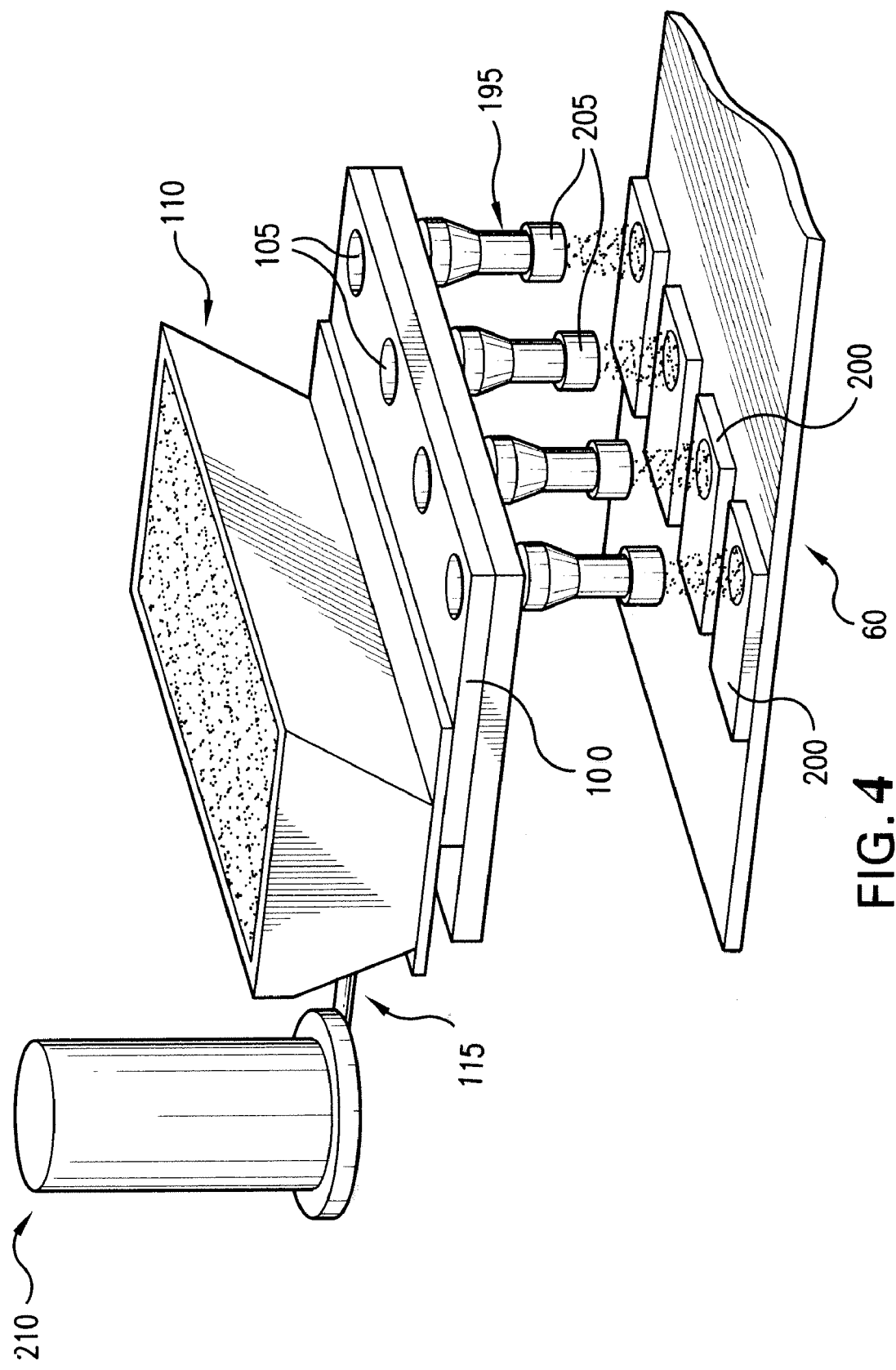
FIG. 4 illustrates a perspective view of a multiple, parallel reciprocating plate dosing system according to the present invention.

Although one preferred embodiment uses a single plate with only one aperture connected to the vacuum system, a plate with a plurality of apertures across the width of the plate is also encompassed by another preferred embodiment of the invention. This is illustrated in FIG. 4. Where like parts are used as in FIG. 3, the same numeric designations are applied. FIG. 4 shows a larger hopper or supply source 110 which supplies particulates to sliding plate 100, which in this embodiment includes four apertures 105 of the same size. This single plate 100 can deposit multiple dosage weights into multiple vacuum systems. For example, the plate can drop at least two, and preferably more than two, dosage weights simultaneously. As shown, four dosage weights can be simultaneously dropped. Each dosage weight is then transported through separate vacuum systems and conduits 195 and ejected through separate nozzles 205. This can provide added accuracy in directing larger quantities of particulates onto a plurality of the substrates. This can be achieved by using a wider plate with the several adjacent apertures 105 placed side-by-side, to concurrently place several doses into several adjacent venturi vacuum tubes 195 arranged therebeneath to transport the particulates to the nozzles 205.

In one embodiment, multiple vacuum systems are placed below the apertures. Preferably, each vacuum system is operatively associated with an aperture. This embodiment is particularly suited to more rapid application of particulates to a larger quantity of substrates where a short length of time (e.g., 60 seconds rather than 3 to 5 minutes) between the substrates being coated to the time the particulates are applied is of great importance. For example, to apply sprinkles to a wet coating on a bank of dipped ice cream bars across a conveyor line, the array of multiple vacuum systems in parallel might be preferred. The sprinkles need to be applied across the whole conveyor line of substrate products within a tiny window of time before the coating on the substrates hardens too much for substantially all the particulates to adhere thereto. In practice, a plurality of apertures drop a measured dose of sprinkles at the same time into multiple vacuum systems. The sprinkles are then directed onto the bars with a conduit to a nozzle for the sprinkle design. Each vacuum system is connected to a separate nozzle such that multiple nozzles can be used to cover the conveyor line. Preferably, one supply source provides the particulates for the entire conveyor line.

As shown in FIGS. 1 and 2, the predetermined dose of particulates or dosage weight is preferably determined by either a volume or loss-in-weight measurement. The amount of the particulates delivered through nozzle 45 is usually controlled by the size of aperture 20 in plate 15. Typically, the aperture in each dose contains and supplies about 0.001 g to 500 g, preferably about 0.01 g to 150 g, and more preferably about 0.05 g to 50 g of the edible particulates to be applied into the vacuum system 35. The aperture can take any available shape, and the aperture is preferably moon-shaped or circular. Any suitable plate size can be used, particularly any dimension across with any plate thickness of the dosing slot is acceptable so long as it is sized and dimensioned to function as part of the overall system described herein, e.g., 0.25 inches to 4 inches thickness are preferred. The vacuum system 35 depicted in FIG. 1 is a single tube or conduit, although as previously discussed numerous systems can be arranged in parallel. Thus, the dosage weight is generally controlled by the volume of aperture 20. This volumetric control system allows a precisely controlled weight of particulates 50 to be applied precisely in a desired pattern to the upper surface of substrate 65 passing beneath nozzle 45.

Dosage weight can also be regulated, however, by controlling the loss of weight in hopper 10. For example, once a loss-in-weight equivalent to the dosage weight is detected by hopper 10 to have been deposited in aperture 20, plate 15 rotates or slides to a position such that aperture 20 can no longer receive particulates from hopper 10. The deposit of the particulates to the plate may be controlled through various loss-in-weight feeding systems, such as vibratory pans, feeding hoppers (agitated or non-agitated), or any other means of delivering the particulates to the plate. The plate actuates to precisely dose the particulates into a directed air stream and directly deposit the particulates through the focused nozzle onto the passing substrate with minimal loss of product. The plate can accommodate a large variety of product sizes and bulk densities to accurately control the dose weight to be applied to the substrate. Alternatively, the dosing system may simply continuously feed particulates downwards into an aperture 20, and once it is full the extra particulates in the downward feed simply remain above and outside the aperture. Then, once the aperture 20 is rotated, slid, or otherwise transported away from the continuous downward particulate feed, the dose has been finalized and more particulates begin falling into the next aperture 20 that is placed under the downward feed from the supply hopper 10.

As shown in FIG. 1, the metered dosing system feeds particulates into the suction end of vacuum system 35. Vacuum system 35 is operatively associated with the dosing system and conduit 40 to supply a directed stream of air to accelerate particulates 50 from the dosing system through conduit 40 and at least substantially vertically through nozzle 45 at a velocity sufficient to eject particulates 50 so as to cut through air currents between nozzle 45 and substrate 65, but that is insufficient to fully penetrate the upper surface of substrate 65 to deposit and adhere a substantial amount of particulates 65 in a desired pattern onto the upper surface of substrate 65. In a preferred embodiment, the particulates are disposed only on the upper surface of the substrate 65 and not on the sides or underneath the substrate 65.

By "substantially vertically" is meant a vertical distance from the nozzle to the substrate. "Substantially" includes completely vertical and can also mean, for example, that the ejected particulates generally moves at an average angle of at least about 60 degrees, and preferably at least about 70 degrees, from the horizontal. Preferably, substantially vertically can mean about 75 to 90 degrees, more preferably from about 80 to 90 degrees from the horizontal. In a most preferred embodiment, the angle from the horizontal is from about 85 to 90 degrees. Preferably, the vertical direction is downwards according to the invention.

The vacuum system preferably includes at least one venturi tube. The vacuum system may be, for example, an off the shelf venturi type, throw-flow vacuum device such as ExAir™ available from ExAir® Corporation, Cincinnati, Ohio. For food applications, the system is preferably all stainless steel or plastic approved for use by the United States Department of Agriculture (USDA). An aperture at the center bottom of the plate is typically positioned over the vacuum system. The vacuum system is attached under the deposit hole in the ultra high molecular weight polyolefin sheet. As depicted in FIG. 1, a conduit 40 in the form of a supply hose or pipe is attached to the outlet of the vacuum system and leads to the nozzle.

The vacuum system is typically adapted and configured to supply about 1.5 psi to 15 psi of air pressure to the particulates. The pressure used will depend on the size and density of the particulates, but will preferably be in the range of about 3 psi to 15 psi. Using a pressure that is too high can result in the air ejecting the particulates from the nozzle at too high of a velocity, which might fully embed the particulates in a substrate and render them difficult to see from the top. The nozzle typically reduces the pressure and slows down the release of the solid particulates. Thus, higher pressures may be used by the vacuum system so long as the nozzle is designed to slow them to a suitable speed for deposit to avoid overdosing or "burying" of the particles in the target substrate. Also, the particulates exit through the nozzle at a controlled speed and volume to more effectively create the desired design pattern on the substrate.

As shown in FIGS. 1 and 2, the vacuum system 35 receives the dose of material and accelerates it through conduit 40 to nozzle 45. A plurality of nozzles (not shown) may also be used, although one nozzle per conduit is preferred to increase control and speed of the particulates. Conduit 40 provides a pathway through which the measured particulates or dosage weight are delivered from the dosing system to nozzle 45 and finally to edible substrates 65. The conduit may be rigid, but preferably includes flexible portions, which may be rubber tubing, plastic tubing or tubing of a similar flexible material.

Nozzle 45 is associated with conduit 40 and is adapted and configured to receive and direct measured particulates 50 from conduit 40 onto the upper surface of a plurality of substrates 65. The particulates are generally ejected from the nozzle in a smooth or laminar flow. At lower speeds, e.g., below 1 ft/min$^3$, the air flow carrying the edible particulates from the nozzle is typically laminar, while at higher speeds it becomes more turbulent. Preferably, slower air flow speeds and more laminar flow increases the control over the particulates and facilitates deposition in an ordered pre-selected pattern, symbol, letter, or the like. Higher air speeds with more turbulent flow are used to achieve a more random particulate patter. The nozzle preferably minimizes or avoids creating a turbulence of particulates in the environment of the edible substrates, which can minimize or prevent precise dosing, reduce or prevent directing substantially all the particulates onto the substrate, or both.

The nozzle can be any shape or size to correspond with the particulate dimensions, flow characteristics, and density of the particulates, taking into account the air pressure supplied by the vacuum system. Preferably, the nozzle is configured to releasably receive and retain a profile that provides a predetermined pattern to direct particulates onto the substrate. The profile may provide any of a number of different patterns, including shapes, lettering, wording, and other decorative random or ordered patterns. The profile determines the pattern of solid particulates for application onto each substrate. In this way, it is possible to include even tradenames or trademarks, shapes, names, numbers, or other writing on the substrate. Moreover, the particulates can be provided in reproducible patterns over numerous substrates, in a manner that hand-dosing of particulates cannot achieve. The one or more openings or holes in the profile allow the particulates being applied to pass therethrough while minimizing or avoiding clogging. The nozzle typically has an outer diameter of about 0.25 inches to 6 inches, preferably about 1 to 4 inches, and more preferably from about 1.5 to 3 inches.

To deliver the predetermined amount of solid particulates to the upper surface of the substrate, the particulates must be ejected from the nozzle with sufficient velocity to overcome the air currents that exist between the nozzle and the moving substrates. Otherwise, the air currents can too easily carry the particulates away from the desired target location on the substrate. These air currents are typically the result of the high speed at which the substrates are conveyed past the nozzle. A decrease in the speed would reduce these currents, but would also reduce the efficiency of the system. Preferably, the substrates are conveyed across the path of particulate transport in an open fashion, i.e., the is no enclosure or other structure above the substrates to direct particles thereon or to retain particles in an enclosed zone. As discussed herein, a collection device can be used typically below the conveyor or substrate transport mechanism to collect extra particulates after application of substantially all the particulates to the substrates.

As previously discussed, the air flow through the nozzle can be triggered either with a photo eye, an ultrasonic height sensor, or an encoder to hit the precise surface of the substrate with the particulates. The nozzle is preferably supplied with pulses of air and particles, which are provided in an appropriate timed relationship (for example, after the particulates have fallen into the apertures from the supply), and is cycled by a suitable timed pulse preferably related to or supplied by sensors associated with the conveyor line and the precise location of the previous or next substrate to which particulates have been or will be applied. To prevent wasting of the particulates during the substrate dosing as a substrate moves away from the nozzle and the next substrate moves beneath the nozzle, the amount of particulates should be precisely metered. The particulates are typically ejected at a rate of, e.g., about 5 pulses/minute to 30 pulses/minute to coincide with a conveyor belt that transports about 5 to 30 substrates/minute past the path of particulate transport.

Apparatus 5 is preferably included in a system for continuously applying a plurality of solid particulate doses to a plurality of edible substrates that also includes a transport mechanism, such as conveyor line 60, to convey each of the plurality of substrates beneath the nozzle for dosing with the particulates. The transport mechanism is generally exposed to the outside environment, and is not enclosed. Although each substrate may be placed directly on the transport mechanism, each is preferably placed on a tray and conveyed in a direction at least substantially transverse or perpendicular to the transport path of the particulates as they are initially directed out of the nozzle. A variable speed conveying mechanism may be employed to convey the substrates past the applicator nozzle at a constant rate, which can be about 5 trays/minute. The particulates are selectively deposited upon each substrate as each substrate passes through the transport path.

By "substantially transverse" is meant that the transport means, such as a conveyor line, is generally lying or going crosswise or at right angles to the transport path of the particulates. For example, the angle between the conveyor line and transport path is usually at least about 75 degrees, preferably at least about 80 degrees, and more preferably at least about 85 degrees.

An exemplary system can be arranged generally as follows. Hopper 10 that holds the particulates to be applied is placed alongside conveyor line 60. Only nozzle 45 is suspended over conveyor line 60 in the food zone with a small adjustable clamp 55 to hold nozzle 45 at the right distance (about 40 inches from conveyor line 60) and generally in the right target area. The nozzle can be at any suitable vertical distance from the transport mechanism, preferably from about 10 inches to 80 inches, more preferably from about 25 inches to about 55 inches. A photo eye leading to the nozzle can detect a tray and turn on the motor to rotate or slide the dosing plate so it will release the actual particulate deposit. The photo eye sensor in the case of an air motor can control an air valve to determine when air should be supplied so that the particulates are released from the nozzle when appropriate.

The system is typically formed using materials that meet or exceed the requirements of the USDA, and preferably therefore incorporates stainless steel supports, stainless steel for surfaces in contact with food, continuous butt welds finished and ground smooth, USDA-approved gasket materials and gasket glue, USDA-approved lubricants for incidental food contact, and USDA-approved plastic materials. The use of standard sanitary fittings (Alpha laval or Tri-clover), air filters, or other USDA approved connectors are typical. Locking wheel castors for portability and food pad levelers are desired for extended use stability at the conveyor line.

Generally, the nozzle should hit the center position on a minimum of preferably about 98 percent of the trays at 120 to 150 trays/minute (transport speed of approximately 100 to 120 feet/minute) on a continuously moving conveyor line without more than 3% of a 40 pound bag of particulates overshooting and hitting the floor. Examples of typical food service trays measure: (1) about 3¾ inches in length and 2½ inches in width; (2) about 4¼ inches in length and 3⅓ inches in width; (3) about 5¼ inches in length and 3 inches in width; (4) about 5 inches in length and 2¼ inches in width; and (5) about 5½ inches in length and 4¼ inches in width. Other suitable tray or substrate sizes are also suitable. For a full-spread of particulates, a uniform dispersion of particulates should cover at least about 90 percent, preferably at least about 95 percent, of the area within the width and length of each tray. The tray location on the conveyor line varies according to the width, length, and height of the conveyor line. The apparatus should have flexibility to be moved for manual adjustments in the three axes of direction to get initial placement over the conveyor line for each tray type and particulate application.

Although other ranges of amounts and types of particulates can be used according to the invention, preferred target amounts for certain particulates are provided in Table 1 below.

TABLE 1

Target Amounts of Certain Particulates

| Particulate Type | Target Amount |
| --- | --- |
| Paprika | 0.25 g ± 0.05 g |
| Parsley | 0.25 g ± 0.05 g |
| Oregano | 0.50 g ± 0.05 g |
| Cheese #1 | 14.0 g ± 0.5 g |
|  | 15.0 g ± 0.5 g |
| Cheese #2 | 18.0 g ± 0.25 g |
|  | 19.0 g ± 0.25 g |
|  | 20.0 g ± 0.25 g |
| Cheese #3 | 29.0 g ± 0.5 g |
| Cheese #4 | 36.0 g ± 0.5 g |
| Cheese #5 | 72.0 g ± 0.5 g |

EXAMPLES

This invention is illustrated by the following examples that are merely for the purpose of illustration and are not to be regarded as limiting the scope of the invention or the manner in which it can be practiced.

Examples 1

Toppings Prepared on an Edible Substrate According to the Invention

Various edible particulate toppings were repetitively applied to a plurality of edible substrates according to the invention in various patterns. These are merely exemplary amount of toppings and exemplary pairings of toppings and edible substrates.

| Example # | Type and amount of topping | Edible substrate |
| --- | --- | --- |
| 1 | 5 grams of grated parmesean particulates | Spaghetti |
| 2 | 11 grams cinnamon/sugar oat crumble | Apple-based dessert |
| 3 | 0.05 grams freeze-dried chives | Chunky potatoes |
| 4 | 0.1 grams paprika | Mashed potatoes |
| 5 | 0.14 grams parsley on mashed potatoes | |
| 6 | 2 grams shredded mozarella/cheddar/bacon blend | Chicken patty |
| 7 | 6 grams chocolate chips | Cherry cobbler |
| 8 | 0.1 grams paprika | Eggs/Potatoes/Both |
| 9 | 0.25 grams red bell peppers | Various |

Other possibilities are readily envisions, for example, 28 grams of shredded mozarella/cheddar blend, optionally with bacon, onto a poultry patty of chicken or turkey.

The system preferably further includes a return system for collecting excess particulates that are not adhered to the substrate or that miss the substrate when directed thereon. Minimal amounts of overspray or loss can be expected even in the present invention, e.g., amounts of less than about 5 weight percent, preferably less than about 3 weight percent, and more preferably less than about 1 weight percent, of the particulates can be collected and recycled. In addition to the application system, a small return system for overspray particulates can be added to catch and recycle the particulates that do not stick to each other and are not contaminated by the substrate by using a catch pan and another in-line vacuum to pick up the overspray and redeposit it, e.g., into the initial feed supply.

The term "about," as used herein, should generally be understood to refer to both numbers in a range of numerals. Moreover, all numerical ranges herein should be understood to include each whole integer within the range.

Although preferred embodiments of the invention have been described in the foregoing description, it will be understood that the invention is not limited to the specific embodiments disclosed herein but is capable of numerous modifications by one of ordinary skill in the art. It will be understood that the materials used and the mechanical details may be slightly different or modified from the descriptions herein without departing from the methods and devices disclosed and taught by the present invention.

What is claimed is:

1. A method of continuously and repeatably applying solid edible particulates to an exposed surface of a plurality of edible substrates which comprises:
    providing a metered amount of solid edible particulates by:
        providing at least one aperture in a plate for measuring a dose of solid edible particulates, wherein the aperture has a predefined volume, an open top and bottom; and is positioned upon a support plate;
        filling a dose of solid edible particulates into each aperture from the top; and
        releasing the metered amount(s) out of the bottom of the aperture(s);
    providing a directed stream of air to receive and transport the metered amount of solid edible particulates in a path that terminates in a predetermined pattern onto the exposed surface of the edible substrates; and
    transporting the metered particulates with a velocity sufficient to cut through air currents that exist in the path of transport adjacent to each substrate, but insufficient to fully penetrate the exposed surface of each substrate, so that a substantial amount of the metered particulates are deposited in the predetermined pattern on the exposed surface of the substrate,
    wherein each substrate receives the same metered amount of particulates from the air stream, each substrate is conveyed in a direction at least substantially transverse to the transport path of the particulates and the directed stream of air is provided by a venturi vacuum system.

2. The method of claim 1, wherein each substrate is a food product comprising at least one of potatoes, chicken, ice cream, chocolate, bread dough, or cookie dough and the particulates comprise spices, nuts, sugar, cheese, powders, colorings, chocolate pieces, or mixtures thereof.

3. The method of claim 1, which further comprises providing a source of particulates that are sized and dimensioned to be about 0.01 inches to about 0.25 inches across, and repeatably metering a predetermined dose of the particulates from the source to provide the metered amount of particulates for sequential application to each substrate.

4. The method of claim 1, wherein the particulates are selectively deposited upon each substrate as each substrate passes through the transport path.

5. The method of claim 1, wherein the predetermined dose of particulates is determined by either a volume or loss-in-weight measurement.

6. The method of claim 1, wherein the particulates are directed in a plurality of pulses selectively onto each substrate to minimize or prevent loss of particulates.

7. The method of claim 1, which further comprises simultaneously transporting a plurality of metered amounts of particulates to a plurality of substrates which each simultaneously receive the same metered amount of particulates.

8. The method of claim 1, which further comprises providing a supply of particulates and a metered dosing system which receives particulates from the supply, creates the metered amounts and delivers the metered amounts of particulates for transport by the air stream.

9. The method of claim 1, wherein the plate includes a plurality of apertures configured to each create the same metered amount of particulates, and the metered amounts are released out of the bottom of the apertures by the relative movement of the plates.

10. The method of claim 9, which further comprises providing a plurality of air streams, one for each aperture, and simultaneously passing a plurality of the edible substrates beneath the air streams so that multiple substrates can simultaneously receive the same metered amount of particulates, and the metered amounts are released by the movement of the plate that has the apertures relative to the support plate.

11. The method of claim 1, wherein the aperture supplies about 0.001 g to 500 g of particulates to the conduit.

12. The method of claim 1, wherein the directed stream of air is provided by a vacuum system comprising at least one venturi tube adapted and configured to supply about 1.5 psi to 15 psi air pressure to the particulates.

13. The method of claim 1, wherein the metered particulates are transported through a conduit to a nozzle, wherein the nozzle has an outer diameter of about 0.25 inches to 6 inches and is configured to releasably receive and retain a profile that provides a predetermined pattern of particulates onto the substrate with the particulates directed in a substantially vertical direction toward each substrate.

14. The method of claim 1, which further comprises collecting excess particulates that are not adhered to the substrate in a return system for re-use.

15. The method of claim 1, wherein the predetermined pattern is a geometric pattern or shape, letters or words, to achieve a repeatable design or pattern for application onto each substrate.

16. A method of continuously and repeatably applying solid edible particulates to an exposed surface of a plurality of edible substrates which comprises:
    providing a metered amount of solid edible particulates by:
        providing at least one aperture in a plate for measuring a dose of solid edible particulates, wherein the aperture has a predefined volume, an open top and bottom; and is positioned upon a support plate;
        filling a dose of solid edible particulates into each aperture from the top; and
        releasing the metered amount(s) out of the bottom of the aperture(s);
    providing a directed stream of air to receive and transport the metered amount of solid edible particulates in a path that terminates in a predetermined pattern onto the exposed surface of the edible substrates; and
    transporting the metered particulates with a velocity sufficient to cut through air currents that exist in the path of transport adjacent to each substrate, but insufficient to fully penetrate the exposed surface of each substrate, so that a substantial amount of the metered particulates are deposited in the predetermined pattern on the exposed surface of the substrate,
    wherein each substrate receives the same metered amount of particulates from the air stream, the particulates are directed in a plurality of pulses selectively onto each substrate to minimize or prevent loss of particulates; and each pulse of particulates is triggered by a sensor comprising a photo eye, an ultrasonic height sensor, or an encoder.

17. The method of claim 16, wherein the particulates are ejected at a rate of about 5 pulses/minute to 600 pulses/minute.

18. The method of claim 16, wherein the aperture is filled with particulates at a filling position and the particulates are exit the aperture at a releasing position, with the method further comprising controlling the moving the aperture from the filling position to the releasing position by a computer that is operatively associated with a pneumatic arm or cam shaft.

19. The method of claim 16, wherein the volume of the aperture can be varied by adding changeable spacers or plate inserts into the aperture.

20. A method of continuously and repeatably applying solid edible particulates to an exposed surface of a plurality of edible substrates which comprises:
    providing a metered amount of solid edible particulates, to a vacuum venturi system which applies a vacuum to generate a laminar air flow containing the metered amounts of solid edible particulates for transport in a path that terminates in a predetermined pattern onto the exposed surface of the edible substrates; and
    transporting the metered particulates with a velocity sufficient to cut through air currents that exist in the path of transport adjacent to each substrate, but insufficient to fully penetrate the exposed surface of each substrate, so that a substantial amount of the metered particulates are deposited in the predetermined pattern on the exposed surface of the substrate,
    wherein each substrate receives the same metered amount of particulates from the air stream.

21. The method of claim 20, which further comprises simultaneously transporting a plurality of metered amounts of particulates to a plurality of substrates which each simultaneously receive the same metered amount of particulates.

* * * * *